(12) United States Patent
Park et al.

(10) Patent No.: US 11,584,333 B2
(45) Date of Patent: Feb. 21, 2023

(54) APPARATUS FOR SEAT BELT INSTALLATION

(71) Applicant: Autoliv Development AB, Vargarda (SE)

(72) Inventors: Sang-Hun Park, Hwaseong-si (KR); Gu-Hyun Jeong, Hwaseong-si (KR); Hyeon-Ki Hong, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/179,033

(22) Filed: Feb. 18, 2021

(65) Prior Publication Data

US 2021/0253060 A1    Aug. 19, 2021

(51) Int. Cl.
*B60R 22/22* (2006.01)
*B60R 22/18* (2006.01)

(52) U.S. Cl.
CPC .............. *B60R 22/22* (2013.01); *B60R 22/18* (2013.01)

(58) Field of Classification Search
CPC ................................. B60R 22/18; B60R 22/22
See application file for complete search history.

(56) References Cited

U.S. PATENT DOCUMENTS

| 3,608,963 | A | * | 9/1971 | Steere, Jr. | B60R 22/22 297/482 |
| 3,622,203 | A | * | 11/1971 | Steere, Jr. | B60R 22/22 297/482 |
| 4,208,778 | A | * | 6/1980 | Ellens | B29C 41/14 264/263 |
| 4,527,835 | A | * | 7/1985 | Barnett | B60R 22/22 297/468 |
| 4,676,555 | A | * | 6/1987 | Tokugawa | B60R 22/26 297/216.1 |
| 5,863,071 | A | * | 1/1999 | Li-Calso | B60R 22/22 280/801.1 |
| 10,710,546 | B2 | * | 7/2020 | Nakaji | B60K 6/08 |
| 2007/0102610 | A1 | * | 5/2007 | Katou | B60R 7/10 248/304 |
| 2014/0237776 | A1 | * | 8/2014 | Sterner | A44B 11/2561 24/163 R |
| 2015/0321639 | A1 | * | 11/2015 | Horsefall | B60N 2/289 24/599.3 |
| 2015/0329075 | A1 | * | 11/2015 | Sohnchen | B60R 22/18 24/573.11 |
| 2019/0092274 | A1 | * | 3/2019 | Nakaji | B60K 17/00 |
| 2019/0308566 | A1 | * | 10/2019 | Blom | B60R 22/18 |
| 2020/0290556 | A1 | * | 9/2020 | Nakaji | B60R 22/18 |
| 2021/0339701 | A1 | * | 11/2021 | Watanabe | B60R 22/24 |

FOREIGN PATENT DOCUMENTS

| JP | H02121383 U | * 10/1990 | ........... H01L 29/786 |
| JP | 07052749 A | 2/1995 | |
| KR | 20-0401586 Y1 | 11/2005 | |
| KR | 10-1504228 B1 | 3/2015 | |
| KR | 10-1758804 B1 | 7/2017 | |
| KR | 101888134 B1 | 8/2018 | |

* cited by examiner

*Primary Examiner* — Barry Gooden, Jr.
(74) *Attorney, Agent, or Firm* — Dickinson Wright PLLC

(57) ABSTRACT

A seat belt installation apparatus having a seat belt installation anchor fixed to a vehicle body and having a lower end portion of a seat belt installed at one side thereof; and a cover configured to shield the anchor and a rotation prevention bead formed on a bottom surface of the vehicle body.

13 Claims, 7 Drawing Sheets

APPARATUS FOR SEAT BELT INSTALLATION

CROSS-REFERENCE TO RELATED APPLICATIONS

This application claims priority pursuant to 35 U.S.C. 119(a) of Korean Patent Application No. 10-2020-0019963, filed Feb. 18, 2020, which application is incorporated herein by reference in its entirety.

TECHNICAL FIELD

The present disclosure relates to a seat belt apparatus, and more particularly, to a seat belt installation apparatus for installing a seat belt on a vehicle body.

BACKGROUND

In general, cars are provided with seat belts on car seats to guarantee driving safety of occupants including a driver.

A seat belt installed in a car is configured to prevent a secondary collision and to mitigate a shock by restraining a body of an occupant upon car collision, and to prevent the occupant from being thrown out of the car.

The most common shape of such a seat belt apparatus is a three-point seat belt apparatus which is a combination of a shoulder-restraining shoulder belt and a waist-restraining lap belt.

The seat belt apparatus may include a seat belt which is woven of synthetic fibers of nylon and polyester in the form of a band, a retractor which stows the seat belt when the seat belt is not used or when a belt length is adjusted according to a sitting posture of an occupant, a buckle and a tongue plate for mounting or releasing the seat belt, and a seat belt guide for fixing one end of the seat belt to the vehicle body.

The applicant of the present application disclosed seat belt apparatus technology in a plurality of documents including patent document 1 and patent document 2 presented below, and obtained the patents.

FIG. 1 is a view illustrating a configuration of a seat belt apparatus according to related-art technology, and FIG. 2 is a view illustrating a configuration of an anchor for installing a seat belt.

As shown in FIG. 1, the seat belt apparatus 1 according to related-art technology includes a seat belt 2 of a band type for fixing an occupant, a retractor 3 in which the seat belt 2 is wound, a belt tongue 4 coupled to a reeled-out end of the seat belt 2, a buckle 5 into which the belt tongue 4 is removably inserted, and a belt guide 6 for guiding reeling-in, reeling-out operations of the seat belt 2. The buckle 5 is fixed to a set bracket provided on a lower portion of a seat 7 through webbing and a bracket.

As shown in FIG. 2, a lower end portion of the seat belt 2 installed on the rear seat 7 of the car is installed on the vehicle body by using a seat belt installation anchor (hereinafter, referred to as an "anchor") 10 which has a shape bent upward from a bottom of the vehicle body by about 90 degrees.

The anchor 10 includes a fixing portion 11 fixed to a bottom surface of the vehicle body, and a bending portion 12 bent upward from one end of the fixing portion 11, and an installation hole 13 may be formed on the bending portion 12 to allow the lower end portion of the seat belt 2 to be installed therein.

Therefore, the lower end portion of the seat belt 2 is inserted from one side of the installation hole of the bending portion 12 and then is drawn out in the opposite direction, is bent upward, and is fixed by sewing.

The fixing portion 11 has a cross section formed in a substantially triangular shape when viewed from above.

Accordingly, in a process of installing the anchor 10 on the bottom surface of the vehicle body, the fixing portion 11 is inserted between one pair of rotation prevention beads 8 protruding from the bottom surface of the vehicle body in a substantially "<" shape, and is fixed to the bottom surface of the vehicle body by screwing a fixing bolt 14.

As described above, the one pair of rotation prevention beads 8 are formed on the bottom surface of the vehicle body and the anchor 10 is installed, and accordingly, a cutaway space is formed on a portion of a car mat 9 where the rotation prevention beads 8 and the anchor 10 are installed.

Accordingly, as the rotation prevention beads 8 and the anchor 10 formed on the bottom surface of the vehicle body are exposed to the outside through the space formed on the car mat, there is a problem that appearance is disfigured.

SUMMARY

An object of the present disclosure is to solve the above-described problem, and is to provide a seat belt installation apparatus which can shield a rotation prevention bead and an anchor formed on a bottom surface of a vehicle body by applying a cover to the anchor.

Another object of the present disclosure is to provide a seat belt installation apparatus which can avoid interference with webbing installed on an anchor when a cover is assembled with the anchor.

To achieve the above-described objects, a seat belt installation apparatus according to the present disclosure includes: a seat belt installation anchor fixed to a vehicle body and having a lower end portion of a seat belt installed at one side thereof; and a cover configured to shield the anchor and a rotation prevention bead formed on a bottom surface of the vehicle body.

The present disclosure relates to a seat belt installation apparatus, which includes: a seat belt installation anchor fixed to a vehicle body and having a lower end portion of a seat belt installed at one side thereof; and a cover configured to shield the anchor and a rotation prevention bead formed on a bottom surface of the vehicle body. A reinforcement portion and support bumps are formed on a rear end portion of the cover to make the cover elastically deformable, and to reinforce stiffness of the cover, and a plurality of support ribs are formed on a lower surface of the cover to completely prevent the cover from moving forward and backward and upward and downward when a vibration or impact is transmitted to the vehicle body. The anchor and the cover are coupled to each other to entirely shield one pair of rotation prevention beads formed on the bottom surface of the vehicle body and an upper surface of a fixing portion of the anchor, so as to prevent a noise by blocking noise occurrence caused by movement of the cover.

According to the seat belt installation apparatus according to the present disclosure as described above, there is an effect of entirely shielding one pair of rotation prevention beads formed on the bottom surface of the vehicle body and an upper surface of a fixing portion of the anchor, by coupling the cover to the anchor for installing a lower end portion of a seat belt on the vehicle body.

Accordingly, according to the present disclosure, there is an effect that the appearance of surroundings of the seat belt installation apparatus can be made to look good, by shielding the one pair of rotation prevention beads and the anchor from being exposed to the outside through a cutaway space on the car mat.

In addition, according to the present disclosure, there is an effect that a breakage or damage of the seat belt caused by interference when the cover is coupled can be prevented in advance, by coupling the rear end portion of the cover to the lower end of the bending portion of the anchor where the seat belt is installed, and then rotating the front end portion of the cover and coupling it to the anchor.

In addition, the present disclosure has a reinforcement portion and support bumps formed on the rear end portion of the cover to make the cover elastically deformable, and to reinforce stiffness of the cover, and has a plurality of support ribs formed on the lower surface of the cover to completely prevent the cover from moving forward and backward and upward and downward when a vibration or impact is transmitted to the vehicle body.

Accordingly, according to the present disclosure, there is an effect of preventing occurrence of a defect caused by a noise and customers' complaints by blocking noise occurrence caused by movement of the cover.

DETAILED DESCRIPTION OF THE INVENTION

Hereinafter, a seat belt installation apparatus according to a preferred embodiment of the present disclosure will be described in detail with reference to the accompanying drawings.

In the following, terms, which indicates directions such as 'left side,' 'right side,' 'front,' 'rear,' 'upper direction,' and 'lower direction' are defined to indicate each direction based on state illustrated in each drawing.

Figure 3:
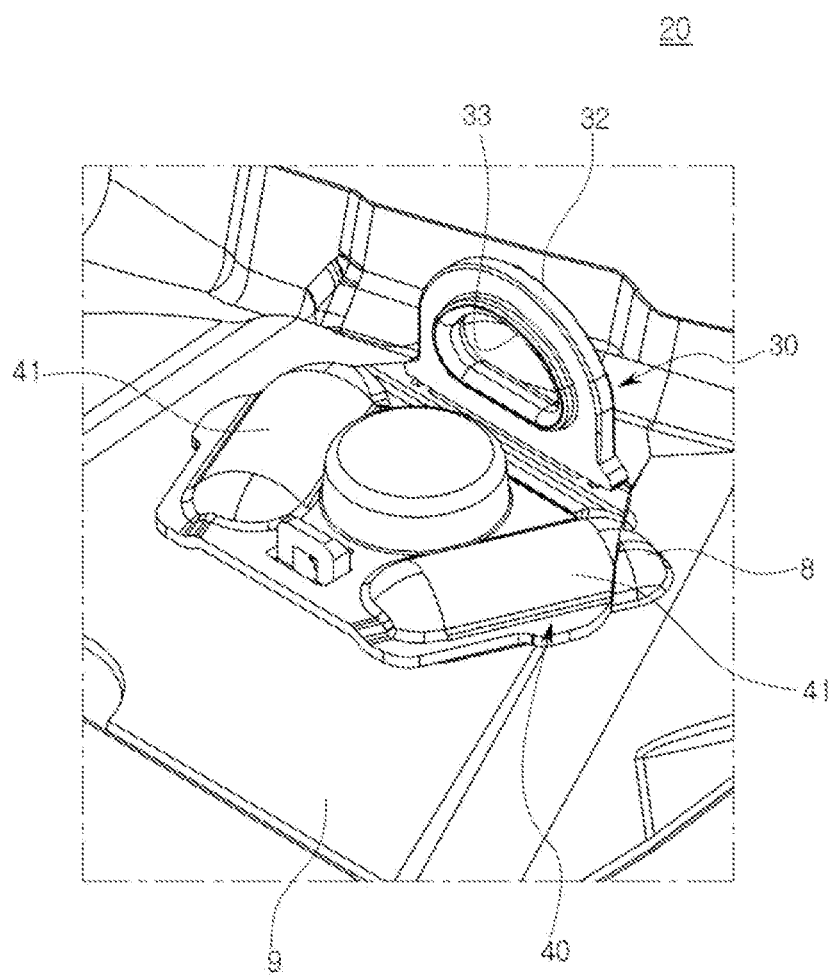
FIG. 3 is a perspective view illustrating a seat belt installation apparatus installed on a vehicle body according to a preferred embodiment of the present disclosure.
Figure 4:
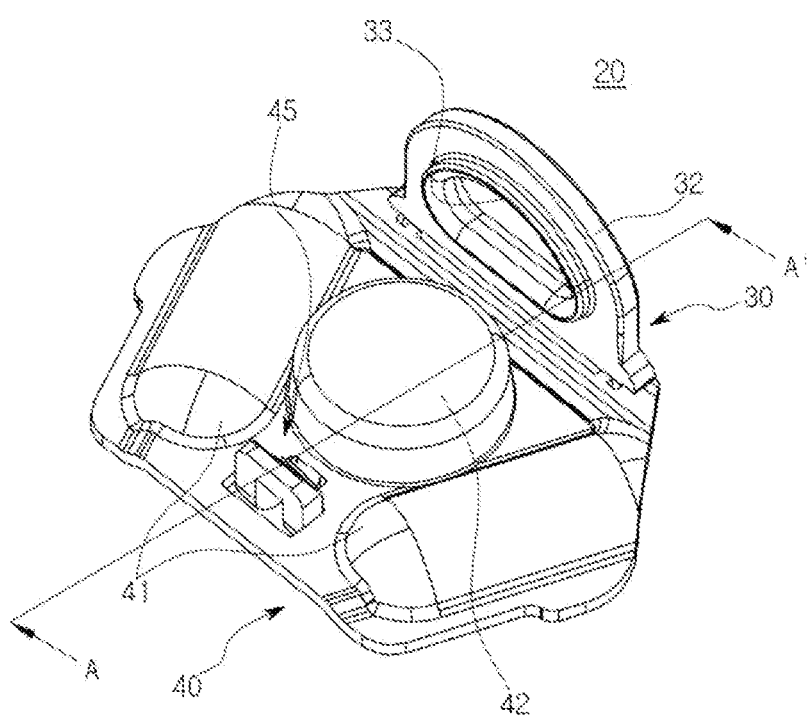
FIG. 4 is a perspective view of the seat belt installation apparatus shown in FIG. 3.
Figure 5:
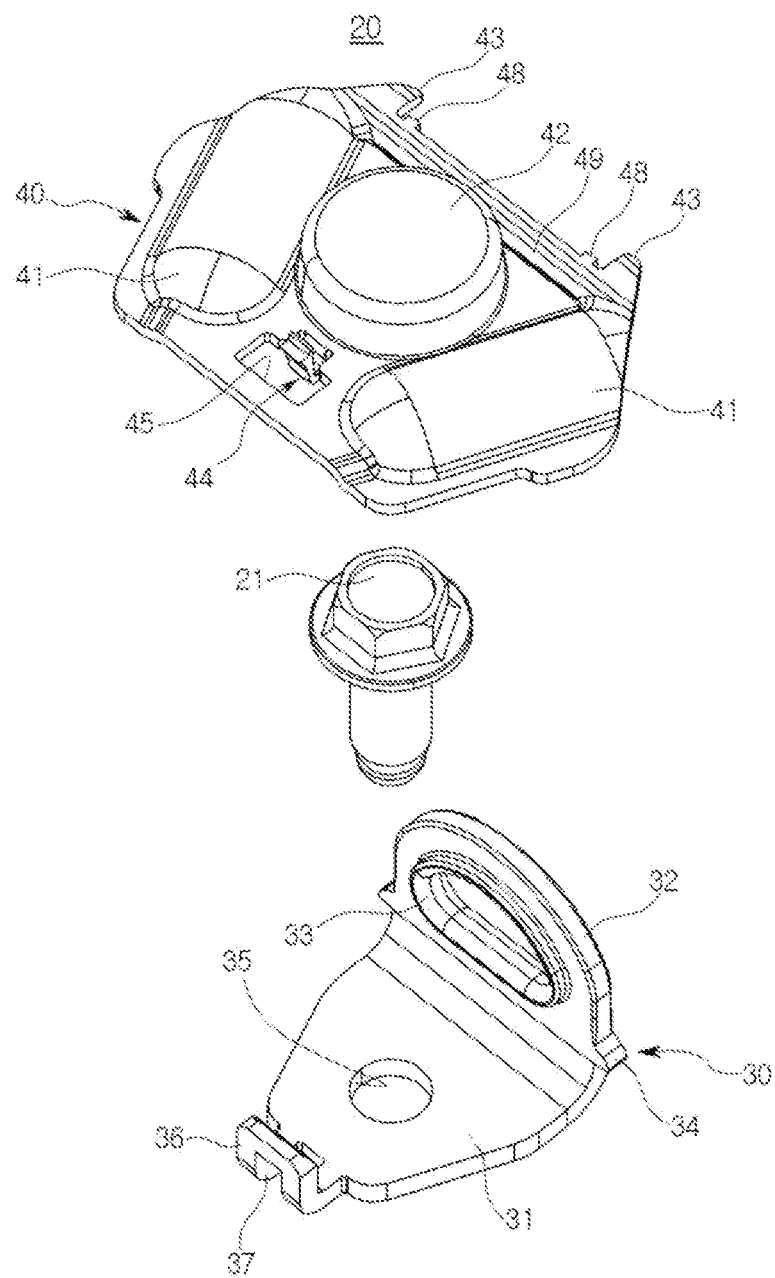
FIG. 5 is an exploded perspective view of the seat belt installation apparatus shown in FIG. 3.
Figure 6:
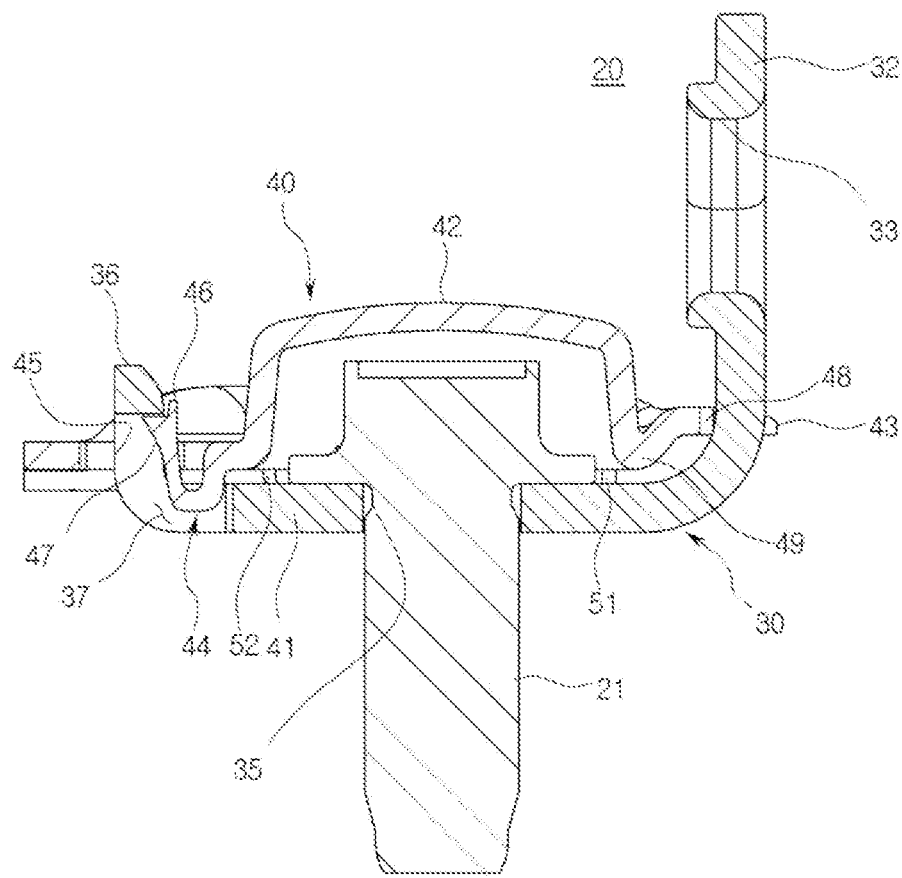
FIG. 6 is a cross-sectional view taken on line A-A' of FIG. 4.
Figure 7:
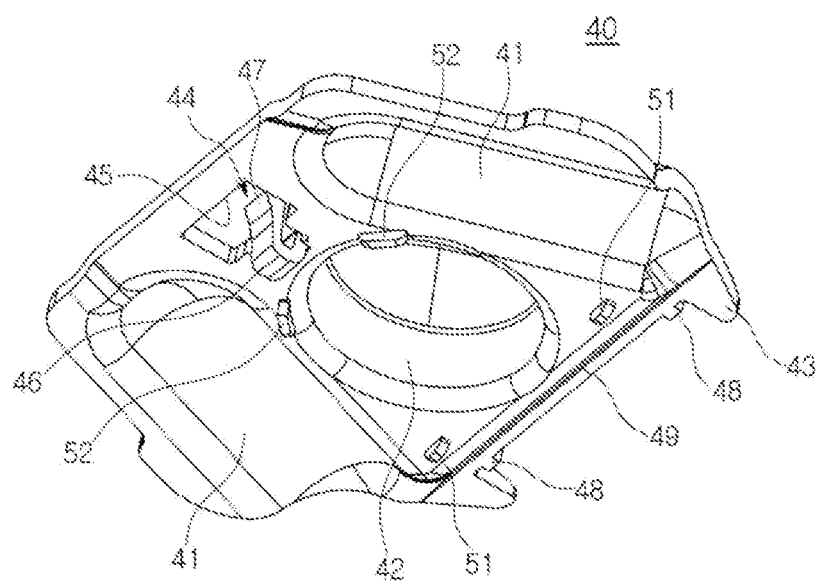
FIG. 7 is a perspective view illustrating a cover shown in FIG. 5 from a different angle; and, FIG. 8 is a view illustrating an operation state to explain a coupling process of an anchor and a cover.

FIG. 3 is a perspective view illustrating a seat belt installation apparatus installed on a vehicle body according to a preferred embodiment of the present disclosure, and FIG. 4 is a perspective view of the seat belt installation apparatus shown in FIG. 3. In addition, FIG. 5 is an exploded perspective view of the seat belt installation apparatus shown in FIG. 3, FIG. 6 is a cross-sectional view taken on line A-A' of FIG. 4, and FIG. 7 is a perspective view illustrating a cover shown in FIG. 5 from a different angle.

The seat belt installation apparatus 20 according to a preferred embodiment of the present disclosure includes a seat belt installation anchor (hereinafter, referred to as an "anchor") 30 which is fixed to a vehicle body and has a lower end portion of a seat belt installed on one side thereof, and a cover to shield the anchor 30 and a rotation prevention bead formed on a bottom surface of the vehicle body, as shown in FIGS. 3 and 4.

Figure 1:
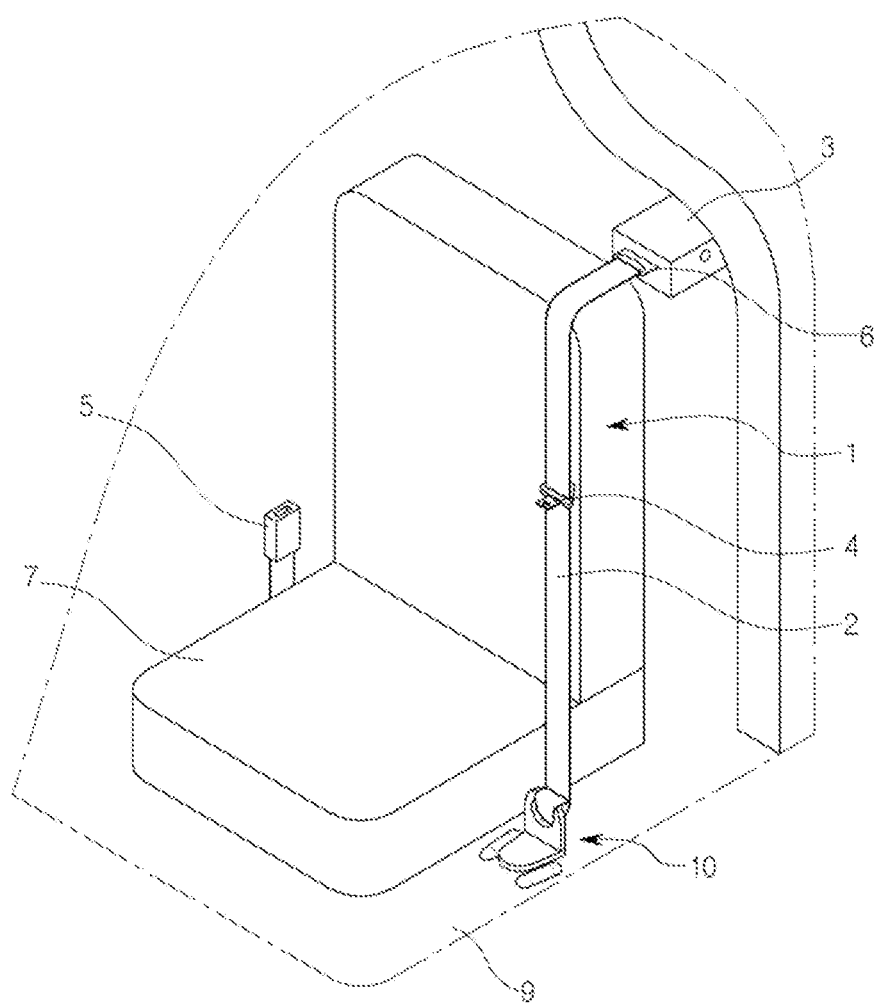
FIG. 1 is a view illustrating a configuration of a seat belt apparatus according to related-art technology.
Figure 2:
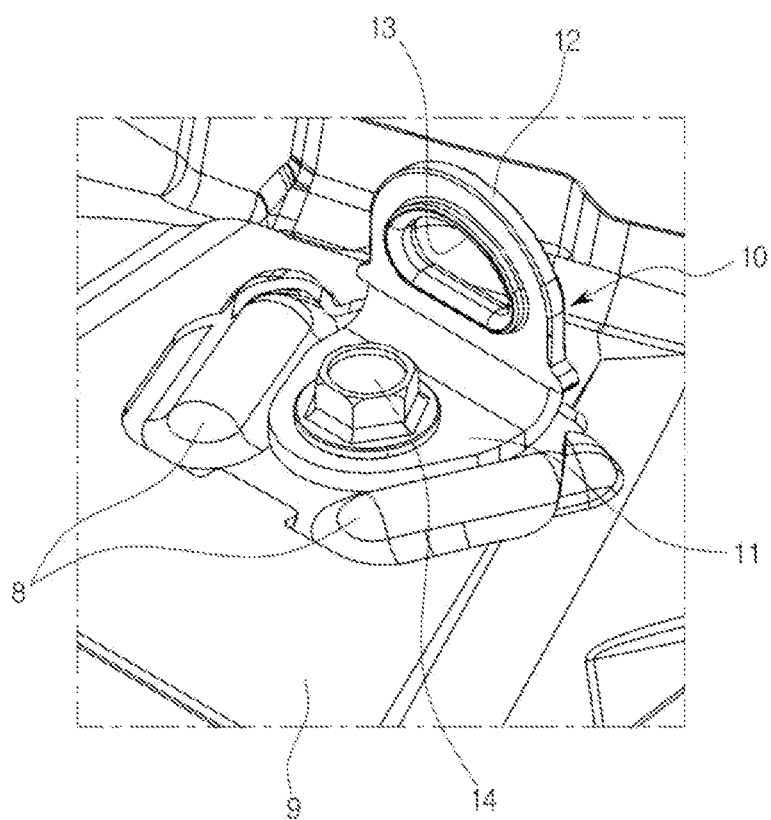
FIG. 2 is a view illustrating a configuration of an anchor for installing a seat belt.

As described above with reference to FIGS. 1 and 2, the anchor 30 includes a fixing portion 31 fixed to the bottom surface of the vehicle body, and a bending portion 32 bent upward from one end of the fixing portion 31, and an installation hole 33 may be formed on the bending portion 32 to allow the lower end portion of the seat belt 2 to be installed therein.

The lower end portion of the seat belt 2 may be inserted into the installation hole 33 of the bending portion 32, may be drawn out in the opposite direction, and then may be bent upward again and may be fixed by sewing.

The fixing portion 31 is formed to have a substantially triangular cross section when viewed from above, and is inserted between one pair of rotation prevention beads 8 protruding from the bottom surface of the vehicle body in a substantially "<" shape, and is fixed to the bottom surface of the vehicle body by screwing a fixing bolt 34.

Herein, a car mat 9 installed on the bottom surface of the vehicle body has a cutaway space formed on a portion where the rotation prevention beads 8 and the anchor 30 are installed, and accordingly, the rotation prevention beads 8 and the anchor 30 are exposed to the outside through the space S formed on the car mat 9.

Accordingly, the present disclosure shields the rotation prevention beads and the anchor by installing a cover in the space, so that the appearance of the portion where the seat belt is installed can be made to look good.

More specifically, the anchor 30 and the cover 40 may be assembled with each other by coupling one side, that is, a rear end of the cover 40 when viewed in FIG. 3, to the anchor 30, and rotating a front end portion of the cover 40 downwardly with reference to the rear end portion coupled to the anchor 30, and coupling to the anchor 30.

As described above, the rear end portion of the cover is coupled to the anchor, first, and the front end portion is rotated to be assembled, so that interference between the seat belt installed on the anchor and the cover can be prevented.

Accordingly, the present disclosure can prevent a damage or breakage of the seat belt in advance, which is caused by interference between the seat belt and the cover when the cover is assembled.

To achieve this, one pair of locking bumps 34 may protrude outward from the bending portion 32 of the anchor 30 to have one pair of coupling bumps 43, which protrude backward from both ends of the cover 40 which will be described below, caught thereon, respectively, as shown in FIGS. 4 to 6.

The one pair of locking bumps 34 may be formed at positions higher than an upper surface of the fixing portion 31, as high as a thickness of the cover 40, or higher than the thickness of the cover 40, so as to couple the rear end portion of the cover 40.

The fixing portion 31 has a penetrating hole 35 formed thereon to have a fixing bolt 21 screwed thereinto to fix the anchor 30 to the bottom surface of the vehicle body, and a coupling protrusion 36 may be formed at a front end of the fixing portion 31 to have a hook portion 44 of the cover 40, which will be described below, coupled thereto.

The coupling protrusion 36 may be formed in a substantially rectangular frame shape having a coupling hole 37 formed therein so as to have the hook portion 44 of the cover 40 disposed therein, and may be bent upward from the front end of the fixing portion 36.

The cover 40 functions to entirely shield the one pair of rotation prevention beads 8 and the upper surface of the fixing portion 31 of the anchor 30.

To achieve this, the cover 40 may have an area larger than the one pair of rotation prevention beads 8 and the upper surface of the fixing portion 31 of the anchor 30, and may be formed of a plate of various shapes such as a polygonal shape including a substantially rectangular shape, or a circular or oval shape.

One pair of bead shielding portions 41 having spaces formed therein to shield the one pair of rotation prevention beads 8 may be provided on both sides of the cover 40, and a bolt shielding portion 42 having a space formed therein to shield the fixing bolt 21 may be provided on a center portion of the cover 40.

Although it is illustrated in FIGS. 3 and 4 that the bolt shielding portion 42 is higher than the one pair of bead shielding portions 41, a change can be made to the present disclosure such that the bolt shielding portion 42 and the one pair of bead shielding portions 41 have the same height to prevent inconvenience caused when an occupant or an operator contacts the cover.

The one pair of coupling bumps 43 may be formed on rear ends of both sides of the cover 40 to be caught on the one pair of locking bumps 34 formed on both sides of the bending portion 32, respectively, when the cover 40 is coupled to the bending portion 32 of the anchor 30.

Herein, a space corresponding to a width of the bending portion 32 may be provided between the one pair of coupling bumps 43.

The hook portion 44 may be provided on a front end portion of the cover 40 to be coupled with the coupling protrusion 36 provided at the front end of the anchor 30.

That is, a through-hole 45 penetrating vertically may be formed on the front end portion of the cover 40, and the hook portion 44 may include a hook 46 formed on a rear end side of the through-hole 45 to be caught on the coupling protrusion 36.

The hook 46 may be doubly bent downward, forward and upward from a rear end of the through-hole 45, and a locking projection 47 may protrude forward from an upper end of the hook 46 to be caught on an upper end portion of the coupling protrusion 36 while rotating from an upper portion to a lower portion of the fixing portion 31.

The cover 40 configured as described above may be manufactured by using a synthetic resin material such as plastic, or a metallic material.

One pair of support bumps 48 may be formed on the rear end portion of the cover 40 between the one pair of coupling bumps 43 as shown in FIGS. 5 to 7.

The one pair of support bumps 48 come into contact with a front surface of the bending portion 32 of the anchor 30 when the anchor 30 and the cover 40 are coupled to each other, and function to support the cover 40 and the bending portion 32 to be spaced apart from each other by a predetermined distance.

To achieve this, the one pair of support bumps 48 may protrude backward from the rear end of the cover 40, respectively, at positions spaced apart from each other by a distance that is shorter than a distance between the one pair of coupling bumps 43.

Herein, a length by which the one pair of support bumps 48 protrude backward may be the same as a distance between the rear end of the cover 40 and the front surface of the bending portion 32 when the hook portion 44 is coupled with the anchor 30, or may be slightly longer than a length between the rear end of the cover 40 and the front surface of the bending portion 32.

Accordingly, when the cover 40 is coupled with the anchor 30, the front end and the rear end of the cover 40 are press-fitted into the fixing portion 31 and the bending portion 32 of the anchor 30, respectively, by the hook portion 30 44 and the one pair of support bumps 48, and the cover 40 is securely fixed not to move forward and backward even if a vibration or impact is transmitted to the vehicle body.

As described above, the one pair of support bumps are provided on the rear end portion of the cover to prevent the cover from moving forward and backward by a vibration or impact transmitted to the vehicle body. Accordingly, the present disclosure can prevent occurrence of a noise caused by backward and forward movements of the cover.

Along with this, a reinforcement portion 49 which is bent in a convex-downward shape may be provided on the rear end portion of the cover 40 to reinforce stiffness and to make the cover flexibly deformable, as shown in FIGS. 6 and 7.

In addition, a plurality of support ribs may be formed on a lower surface of the cover 40.

For example, one pair of first support ribs 51 may be formed on a rear end portion side of the lower surface of the cover 40, and one pair of second support ribs 52 may be formed on a center portion, as shown in FIG. 7.

The one pair of first support ribs 51 may be formed on a rear side of the bolt shielding portion 42, and may be spaced apart from each other by a predetermined distance in parallel along a horizontal direction, and the one pair of second support ribs 52 may be formed on a front side of the bolt shielding portion 42, and may be spaced apart from each other by a predetermined distance along an edge of the bolt shielding portion 42.

Herein, the first and second support ribs 51, 52 may be formed at the same height as a distance between the lower surface of the cover 40 and the upper surface of the fixing portion 31, or may be formed at a height slightly higher than the distance between the lower surface of the cover 40 and the upper surface of the fixing portion 31 in a state where the front end portion of the cover 40 is coupled with the fixing portion 31 of the anchor 30 by the hook portion 44.

Therefore, the cover 40 is supported on the upper surface of the fixing portion 31 by the first and second support ribs 51, 52 while being coupled with the anchor 30.

Accordingly, the cover 40 may be supported by the plurality of support ribs 51, 52 while being coupled with the anchor 30 by the hook portion 44.

In particular, if lengths of the plurality of support ribs 51, 52 are longer than the distance between the cover 40 and the anchor 30, the center portion of the cover 40 may be elastically deformed in a convex-upward shape, and the cover 40 may be securely fixed to the anchor 30 not to move in the vertical direction even when a vibration or impact is transmitted to the vehicle body.

As described above, the present disclosure has the reinforcement portion and the support bumps formed on the rear end portion of the cover to make the cover elastically deformable and to reinforce stiffness of the cover, and has the plurality of support ribs formed on the lower surface of the cover to completely prevent the cover from moving forward and backward and upward and downward when a vibration or impact is transmitted to the vehicle body.

Accordingly, the present disclosure can prevent occurrence of a defect caused by a noise and customers' complaints by blocking noise occurrence caused by movement of the cover.

Hereinafter, a coupling relationship and an operating method of the seat belt installation apparatus according to a preferred embodiment of the present disclosure will be described in detail with reference to FIGS. 4 and 8.

Figure 8:
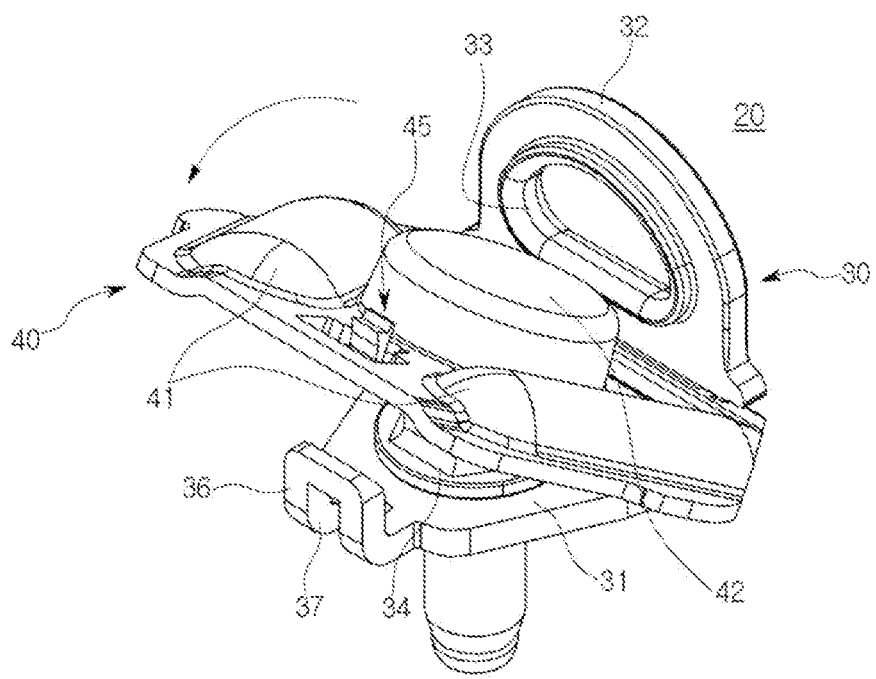

FIG. 8 is a view illustrating an operation state to explain a coupling process of the anchor and the cover.

First, an operator places the anchor 30 on a bottom surface of a vehicle body and fixes the anchor 30 by screwing the fixing bolt 21. Herein, the lower end portion of the seat belt 2 has been already connected to the installation hole 33 formed on the bending portion 32 of the anchor 30.

In this case, when the fixing bolt 21 is screwed, the fixing portion 31 of the anchor 30 is disposed between the one pair of rotation prevention beads 8 formed on the bottom surface of the vehicle body, such that rotation is prevented in the process of screwing the fixing bolt 21.

In addition, as shown in FIG. 7, the one pair of coupling bumps 43 formed on the rear end portion of the cover 40 are coupled to lower portions of the one pair of locking bumps 34 formed on both sides of the bending portion 32 of the anchor 30.

Next, the front end portion of the cover 40 is rotated downward with reference to the rear end portion of the cover 40 coupled with the fixing portion 31 of the anchor 30, and is pressed.

Then, the hook 46 provided on the front end portion of the cover 40 is moved to a lower portion of the coupling protrusion 36 provided on the front end of the fixing portion 31 of the anchor 30, and the locking projection 47 of the upper end of the hook 46 is locked into the coupling protrusion 36, such that the cover 40 is stably coupled to the anchor 30.

Through the above-described process, the present disclosure couples the cover to the anchor for installing the lower end portion of the seat belt on the vehicle body, thereby entirely shielding the one pair of rotation prevention beads formed on the bottom surface of the vehicle body and the upper surface of the fixing portion of the anchor.

Accordingly, the present disclosure shields the one pair of rotation prevention beads and the anchor from being exposed to the outside through a cutaway space on the car mat, so that the appearance of surroundings of the seat belt installation apparatus can be made to look good.

In addition, the present disclosure couples the rear end portion of the cover to the lower end of the bending portion of the anchor where the seat belt is installed, and then rotates the front end portion of the cover and couples it to the anchor, so that a breakage or damage of the seat belt caused by interference when the cover is coupled can be prevented in advance In addition, the present disclosure has the reinforcement portion and the support bumps formed on the rear end portion of the cover to make the cover elastically deformable, and to reinforce stiffness of the cover, and has the plurality of support ribs formed on the lower surface of the cover to completely prevent the cover from moving forward and backward and upward and downward when a vibration or impact is transmitted to the vehicle body.

Accordingly, the present disclosure can prevent occurrence of a defect caused by a noise and customers' complaints by blocking noise occurrence caused by movement of the cover.

Although the invention is specifically described according to the above embodiments, the present invention is not limited to the above embodiments, and may be modified variously within a scope of the technical essence of the present disclosure.

That is, the present disclosure may be changed to couple the front end portion of the cover to the front end of the fixing portion of the anchor and then rotate the cover with reference to the coupled front end and couple the rear end portion to the bending portion of the anchor.

However, when the rear end of the cover is coupled later as described above, there may be a problem that the seat belt may be destroyed or damaged by interference between the cover and the seat belt.

Accordingly, it is preferable to assemble by coupling the rear end portion of the cover to the lower portion of the bending portion of the anchor, first, and then, rotating the cover and coupling the front end portion to the fixing portion of the anchor.

The present disclosure is applied to seat belt installation apparatus technology, which couples a cover to an anchor for installing a lower end portion of a seat belt on a vehicle body, thereby entirely shielding one pair of rotation prevention beads formed on a bottom surface of the vehicle body and an upper surface of a fixing portion of the anchor.

The invention claimed is:

1. A seat belt installation apparatus for a vehicle body having a bottom surface, the seat belt installation apparatus comprising:
   a seat belt installation anchor having a fixing portion and a bending portion, the fixing portion fixed in position between a pair of rotation prevention beads formed on the bottom surface of the vehicle body and the bending portion receiving a lower end portion of a seat belt; and
   a cover configured to shield the fixing portion of the anchor and the pair of rotation prevention beads located at both sides of the fixing portion of the anchor such that the bending portion coupled with the lower end portion of the seat belt is exposed.

2. The seat belt installation apparatus of claim 1, wherein the cover is assembled by being rotated and coupled to a front end portion of the anchor with a rear end portion thereof being coupled to a lower end of the bending portion of the anchor where the seat belt is installed, so as to inhibit a breakage or a damage of the seat belt installed on the anchor when the cover is assembled to the anchor.

3. The seat belt installation apparatus of claim 2, wherein one pair of locking bumps protrude outward from both sides of the bending portion, respectively, and
   wherein one pair of coupling bumps protrude from the rear end portion of the cover to be coupled and caught on lower portions of the one pair of locking bumps.

4. The seat belt installation apparatus of claim 3, wherein the anchor has a coupling protrusion of a rectangular frame shape formed on a front end of the fixing portion installed on the bottom surface of the vehicle body, and
   wherein a hook portion is provided on a front end portion of the cover to be coupled and caught on the coupling protrusion.

5. The seat belt installation apparatus of claim 4, wherein the coupling protrusion is bent upward from the front end of the fixing portion, wherein a through-hole is formed on the front end portion of the cover to penetrate in a vertical direction, and
   wherein the hook portion is doubly bent downward, forward, upward from a rear end of the through-hole, and comprises a hook which has a locking projection formed on an upper end thereof to be caught on an upper end portion of the coupling protrusion.

6. The seat belt installation apparatus of claim 3, wherein one pair of support bumps protrude backward from a rear end portion of the cover to come into contact with a front surface of the anchor, and
wherein the one pair of support bumps are formed to have a same length as a distance between the rear end of the cover and the front surface of the bending portion of the anchor or to have a length longer than the distance so as to inhibit the cover from moving forward and backward when the cover and the anchor are coupled to each other.

7. The seat belt installation apparatus of claim 6, wherein a reinforcement portion is bent on the rear end portion of the cover in a convex-downward shape, and
wherein a plurality of support ribs are formed on a lower surface of the cover to be supported on an upper surface of the fixing portion so as to inhibit the cover from moving upward and downward when the cover and the anchor are coupled to each other.

8. The seat belt installation apparatus of claim 7, wherein the plurality of support ribs comprise:
one pair of first support ribs formed on a rear end portion of the lower surface of the cover, and spaced apart from each other by a predetermined distance in parallel along a horizontal direction; and
one pair of second support ribs formed on a center portion of the cover and spaced apart from each other by a predetermined distance,
wherein the one pair of first support ribs and the one pair of second support ribs are formed to have the same length as a distance between the lower surface of the cover and the upper surface of the anchor or to have a length longer than the distance, respectively, when the cover and the anchor are coupled to each other.

9. A seat belt installation apparatus comprising:
a seat belt installation anchor including a fixing portion fixed to a vehicle body and receiving a lower end portion of a seat belt installed at one side thereof; and
a cover configured to shield the anchor and at least one rotation prevention bead formed on a bottom surface of the vehicle body when the cover is assembled to the anchor,
wherein the anchor has a coupling protrusion of a rectangular frame shape formed on a front end of the fixing portion installed on the bottom surface of the vehicle body, and
wherein a hook portion is provided on a front end portion of the cover to be coupled and caught on the coupling protrusion.

10. The seat belt installation apparatus of claim 9, wherein the coupling protrusion is bent upward from the front end of the fixing portion, wherein a through-hole is formed on the front end portion of the cover to penetrate in a vertical direction, and
wherein the hook portion is doubly bent downward, forward, upward from a rear end of the through-hole, and comprises a hook which has a locking projection formed on an upper end thereof to be caught on an upper end portion of the coupling protrusion.

11. A seat belt installation apparatus comprising:
a seat belt installation anchor having a fixing portion and a bending portion, the fixing portion fixed to a vehicle body and the bending portion receiving a lower end portion of a seat belt; and
a cover configured to shield the anchor and at least one rotation prevention bead formed on a bottom surface of the vehicle body when the cover is assembled to the anchor,
wherein one pair of support bumps protrude backward from a rear end portion of the cover to come into contact with a front surface of the bending portion of the anchor, and
wherein the one pair of support bumps are formed to have a same length as a distance between the rear end of the cover and the front surface of the bending portion of the anchor or to have a length longer than the distance so as to inhibit the cover from moving forward and backward when the cover and the anchor are coupled to each other.

12. The seat belt installation apparatus of claim 11, wherein a reinforcement portion is bent on the rear end portion of the cover in a convex-downward shape, and
wherein a plurality of support ribs are formed on a lower surface of the cover to be supported on an upper surface of the fixing portion so as to inhibit the cover from moving upward and downward when the cover and the anchor are coupled to each other.

13. The seat belt installation apparatus of claim 12, wherein the plurality of support ribs further comprise:
one pair of first support ribs formed on a rear end portion of the lower surface of the cover, and spaced apart from each other by a predetermined distance in parallel along a horizontal direction; and
one pair of second support ribs formed on a center portion of the cover and spaced apart from each other by a predetermined distance,
wherein the one pair of first support ribs and the one pair of second support ribs are formed to have the same length as a distance between the lower surface of the cover and the upper surface of the anchor or to have a length longer than the distance, respectively, when the cover and the anchor are coupled to each other.

\* \* \* \* \*